(12) United States Patent
Cho

(10) Patent No.: US 10,775,791 B2
(45) Date of Patent: Sep. 15, 2020

(54) IMAGE PROCESSING APPARATUS AND METHOD FOR VEHICLE

(71) Applicants: Hyundai Motor Company, Seoul (KR); Kia Motors Corporation, Seoul (KR)

(72) Inventor: Sung Tae Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 16/101,468

(22) Filed: Aug. 12, 2018

(65) Prior Publication Data

US 2019/0204835 A1    Jul. 4, 2019

(30) Foreign Application Priority Data

Jan. 3, 2018    (KR) .................. 10-2018-0000760

(51) Int. Cl.
*G06F 1/00* (2006.01)
*G05D 1/00* (2006.01)
*B60R 11/04* (2006.01)
*G06K 9/00* (2006.01)
*B60R 1/00* (2006.01)

(52) U.S. Cl.
CPC ............ *G05D 1/0094* (2013.01); *B60R 1/00* (2013.01); *B60R 11/04* (2013.01); *G05D 1/0088* (2013.01); *G06K 9/00369* (2013.01); *G06K 9/00798* (2013.01); *G06K 9/00805* (2013.01); *B60R 2300/804* (2013.01); *B60R 2300/8033* (2013.01); *G05D 2201/0213* (2013.01)

(58) Field of Classification Search
CPC ....... G05D 1/0094; G05D 1/0088; B60R 1/00; B60R 11/04; G06K 9/00369; G06K 9/0798; G06K 9/00805
See application file for complete search history.

(56) References Cited

U.S. PATENT DOCUMENTS

| | | | | |
|---|---|---|---|---|
| 2003/0151664 A1* | 8/2003 | Wakimoto | ......... | G01C 21/3602 348/148 |
| 2012/0327233 A1* | 12/2012 | Imai | ..................... | B60W 40/114 348/148 |
| 2015/0344032 A1* | 12/2015 | Oh | ........................ | H04N 13/271 701/37 |
| 2015/0356364 A1* | 12/2015 | Jung | ................... | G06K 9/00604 382/117 |
| 2016/0349066 A1* | 12/2016 | Chung | ............... | G01C 21/3658 |
| 2018/0239441 A1* | 8/2018 | Osugi | ..................... | G06F 3/013 |
| 2018/0365859 A1* | 12/2018 | Oba | ..................... | B60W 40/114 |
| 2019/0056749 A1* | 2/2019 | Kim | ..................... | H04N 13/211 |
| 2019/0071074 A1* | 3/2019 | Gokan | ................ | G05D 1/0257 |

(Continued)

*Primary Examiner* — Md K Talukder
(74) *Attorney, Agent, or Firm* — Mintz Levin Cohn Ferris Glovsky and Popeo, P.C.; Peter F. Corless

(57) ABSTRACT

An image processing apparatus for a vehicle can include: a camera configured to capture an image around the vehicle; a driving device adjusting an image capturing direction of the camera; a location recognition device detecting a location of the vehicle; a pedestrian recognition device detecting a pedestrian around the vehicle; and a processor controlling the driving device so as to adjust the image capturing direction of the camera based on information detected by at least one of the location recognition device and the pedestrian recognition device.

13 Claims, 4 Drawing Sheets

(56) References Cited

U.S. PATENT DOCUMENTS

| 2019/0135294 A1* | 5/2019 | Sato | G06K 9/32 |
| 2019/0144001 A1* | 5/2019 | Choi | G08G 1/0141 |
| | | | 701/117 |
| 2019/0204835 A1* | 7/2019 | Cho | G06K 9/00791 |

* cited by examiner

IMAGE PROCESSING APPARATUS AND METHOD FOR VEHICLE

CROSS-REFERENCE TO RELATED APPLICATION

This application is based on and claims the benefit of priority to Korean Patent Application No. 10-2018-0000760, filed on Jan. 3, 2018 in the Korean Intellectual Property Office, the disclosure of which is incorporated herein in its entirety by reference.

TECHNICAL FIELD

The present disclosure relates to an image processing apparatus and method for a vehicle and, more particularly, to an image processing apparatus and method for a vehicle capable of dynamically adjusting the angle of a camera mounted on the vehicle depending on surrounding situations of the vehicle to serve a necessary image to a driver.

BACKGROUND

Recently, various systems designed to assist in safe driving have been applied to vehicles. For example, a driver assist system, such as an automatic parking system, a lane keeping assist system, a collision avoidance system, or the like, may capture a surrounding image of a vehicle using a surround view monitor (SVM) and display the captured image on a display screen.

A conventional SVM obtains surrounding images of the vehicle through a plurality of stationary cameras mounted on the vehicle. The SVM also performs image processing with respect to the obtained images, and provides the processed images as top-view images. However, since the view angle of a stationary camera is fixed, the capture range of such camera is limited. Therefore, in conventional systems, only images in the fixed capture range may be obtained regardless of the driving environment of the vehicle.

SUMMARY

The present disclosure has been made to solve the above-mentioned problems occurring in the related art, while advantages achieved by the related art are maintained intact.

An aspect of the present disclosure provides an image processing apparatus and method for a vehicle capable of serving a necessary image to a driver by recognizing information of a lane on which the vehicle is driving and by dynamically adjusting the angle of a camera.

Another aspect of the present disclosure provides an image processing apparatus and method for a vehicle which ensures the visibility necessary for a driver to safely detect a pedestrian around the vehicle by dynamically adjusting the angle of a camera when the pedestrian is detected.

The technical problems to be solved by the present disclosure are not limited to the aforementioned problems, and any other technical problems not mentioned herein will be clearly understood from the following description by those skilled in the art to which the present disclosure pertains.

According to embodiments of the present disclosure, an image processing apparatus can include: a camera configured to capture an image around the vehicle; a driving device adjusting an image capturing direction of the camera; a location recognition device detecting a location of the vehicle; a pedestrian recognition device detecting a pedestrian around the vehicle; and a processor controlling the driving device so as to adjust the image capturing direction of the camera based on information detected by at least one of the location recognition device and the pedestrian recognition device.

The driving device can rotate the camera up, down, left, or right using a motor.

The location recognition device can detect information indicating a number of lanes of a road on which the vehicle is driving or information indicating a lane on which the vehicle is located.

The processor can calculate the image capturing direction of the camera based on the information indicating the number of lanes of a road on which the vehicle is driving or information indicating a lane on which the vehicle is located.

The pedestrian recognition device calculates an appearance angle of the pedestrian when the pedestrian is detected around the vehicle.

The processor can calculate the image capturing direction of the camera based on the appearance angle of the pedestrian.

The image capturing direction of the camera can be an angle famed between a longitudinal axis of the vehicle and a camera axis.

The image processing apparatus can further include a display device displaying the image captured by the camera.

The camera can sense a median strip, and the location recognition device detects a lane on which the vehicle is located based on an angle famed between a longitudinal axis of the vehicle and the median strip.

Furthermore, according to embodiments of the present disclosure an image processing method can include: detecting a location of the vehicle using a location recognition device; detecting a pedestrian around the vehicle using a pedestrian recognition device; calculating an image capturing direction of a camera based on at least one of the location of the vehicle and a location of the pedestrian; and controlling a driving device so as to adjust the camera in accordance with the image capturing direction of the camera.

The detecting of the location of the vehicle and the detecting of the pedestrian can include detecting information indicating a number of lanes of a road on which the vehicle is driving or information indicating a lane on which the vehicle is located.

The calculating of the image capturing direction of the camera can include calculating the image capturing direction of the camera, based on the information indicating a number of lanes of a road on which the vehicle is driving or the information indicating a lane on which the vehicle is located.

The detecting of the location of the vehicle and the detecting of the pedestrian can include calculating an appearance angle of the pedestrian when the pedestrian is detected around the vehicle.

The calculating of the image capturing direction of the camera can include calculating the image capturing direction of the camera based on the appearance angle of the pedestrian.

The image capturing direction of the camera can be defined by using an angle famed between a longitudinal axis of the vehicle and a camera axis.

The controlling of driving device to adjust the camera can include adjusting an angle of the camera by driving a motor in the image capturing direction of the camera.

The image processing method can further include displaying, on a display screen, an image captured by the camera having the adjusted angle, after the controlling of the driving device to adjust the camera.

BRIEF DESCRIPTION OF THE DRAWINGS

The above and other objects, features and advantages of the present disclosure will be more apparent from the following detailed description taken in conjunction with the accompanying drawings.

Figure 1:
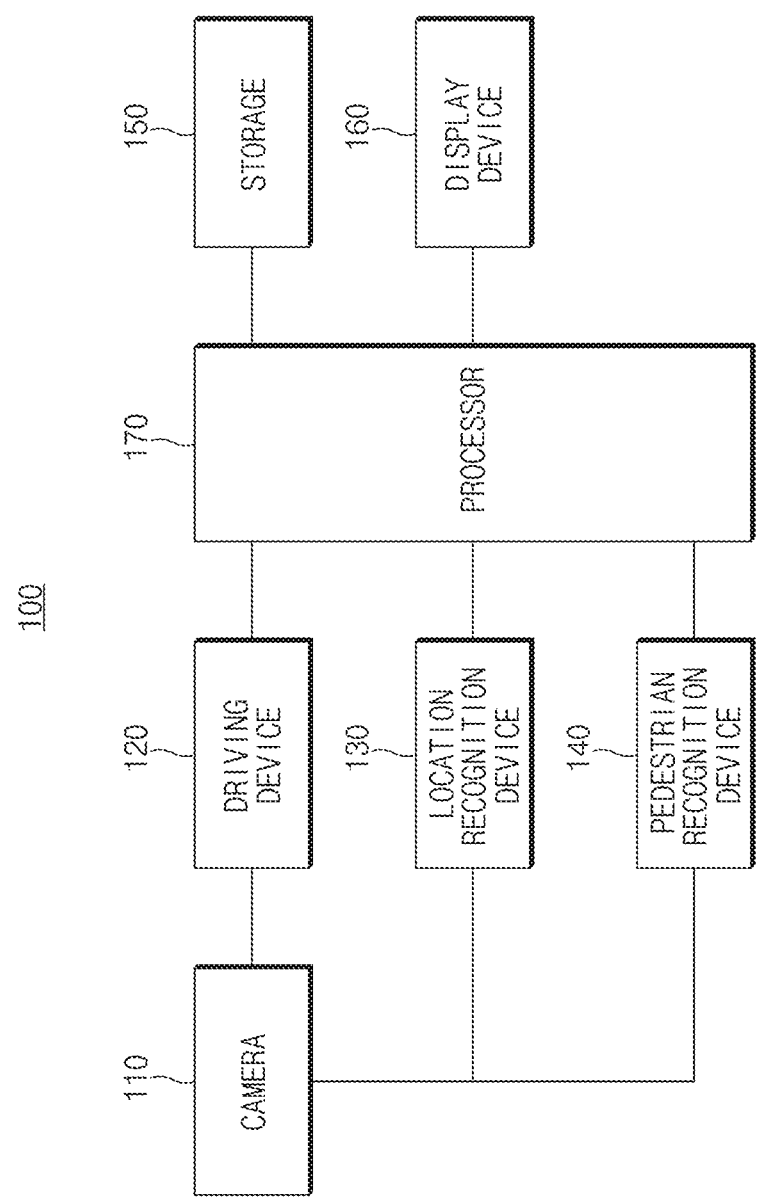
FIG. 1 is a block diagram illustrating an image processing apparatus for a vehicle, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus comprising the control unit in conjunction with one or more other components, as would be appreciated by a person of ordinary skill in the art.

Figure 2:
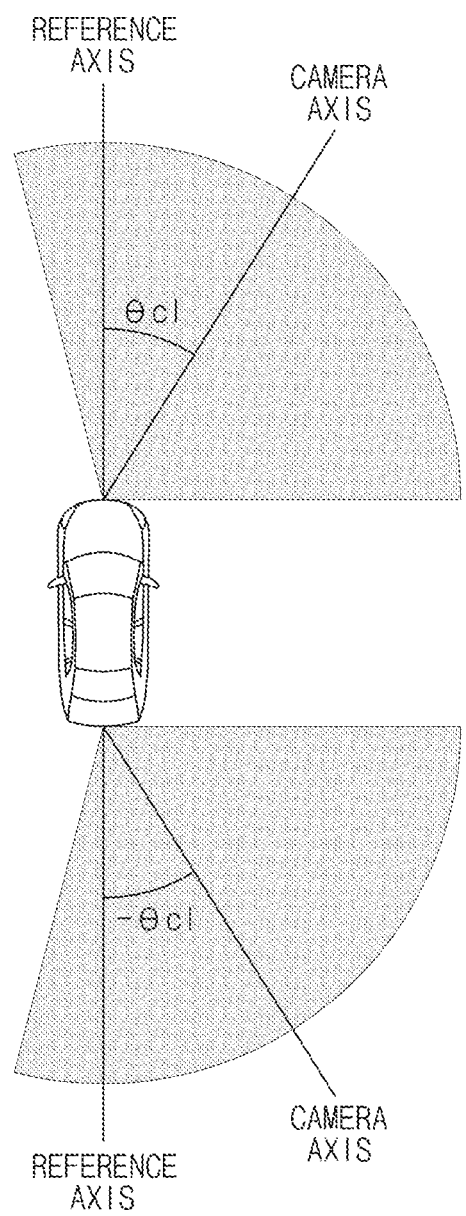
FIG. 2 is a view illustrating that an image capturing direction of a camera is adjusted through a vehicle location recognition manner, according to embodiments of the present disclosure.
Figure 3:
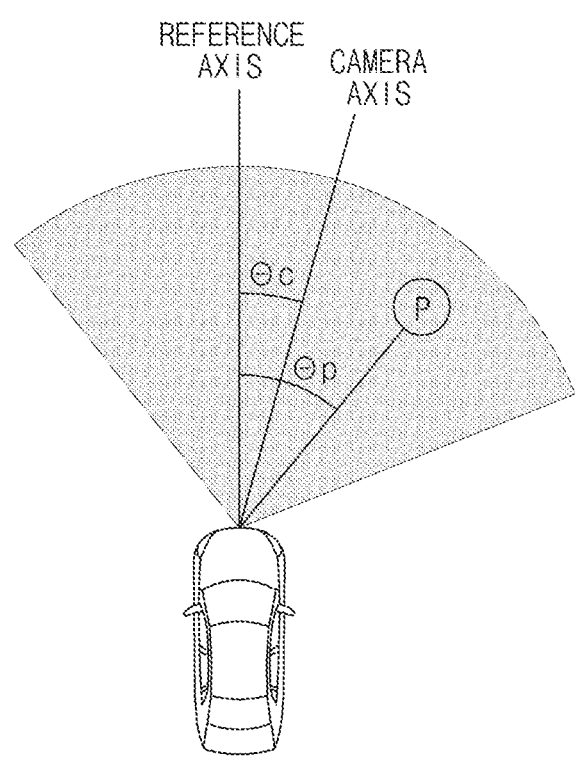
FIG. 3 is a view illustrating that an image capturing direction of the camera is adjusted through a pedestrian recognition manner, according to embodiments of the present disclosure.

Referring now to the disclosed embodiments, FIG. 1 is a block diagram illustrating an image processing apparatus for a vehicle, according to embodiments of the present disclosure. FIG. 2 is a view illustrating that an image capturing direction of a camera is adjusted through a vehicle location recognition manner, according to embodiments of the present disclosure. FIG. 3 is a view illustrating that the image capturing direction of the camera is adjusted through a pedestrian recognition manner, according embodiments of to the present disclosure.

Referring first to FIG. 1, an image processing apparatus 100 for a vehicle (hereinafter, referred to as "image processing apparatus") includes a camera 110, a driving device 120, a location recognition device 130, a pedestrian recognition device 140, a storage 150, a display device 160, and a processor 170.

The camera 110 is mounted on the vehicle to capture a surrounding image of the vehicle. At least one camera 110 may be disposed in the vehicle. For example, a front camera 110 and a rear camera 110 may be mounted on a front portion and a rear portion of the vehicle.

The camera 110 may be implemented with at least one of a charge coupled device (CCD) image sensor, a complementary metal oxide semi-conductor (CMOS) image sensor, a charge priming device (CPD) image sensor, a charge injection device (CID) image sensor, and the like. The camera 110 may include at least one of a standard lens, an ultra-wide-angle lens, a wide-angle lens, a zoom lens, a macro lens, a telephoto lens, a fisheye lens, a quasi-fisheye lens, and the like. The camera 110 may include at least one lighting device. The lighting device may be implemented with a light emitting diode (LED).

The driving device 120 adjusts the angle of the camera 110 by controlling the operation of the motor to rotate the camera 110 in at least one of up, down, left, and right directions. The driving device 120 may adjust the image capturing direction of the camera 110 by adjusting the angle of the camera 110. In this case, the image capturing direction of the camera 110, which is the direction of a camera axis, is expressed by using an angle formed between a longitudinal axis of the vehicle and the camera axis.

The location recognition device 130 detects (measures) the location of the vehicle on a road on which the vehicle is driving. The location recognition device 130 may determine the location of the vehicle by analyzing the image captured through the camera 110. In addition, the location recognition device 130 may detect the location of the vehicle by using a sensor provided inside the vehicle (in-vehicle sensor). In this case, in-vehicle sensors may include a radio detecting and ranging (radar) sensor, a light detection and ranging (LiDAR) sensor, an ultrasonic sensor, and/or a global positioning system (GPS) module.

The location recognition device 130 detects information indicating the total number of lanes (Nt) of a road on which the vehicle is currently driving and information (Nc) indicating a lane on which the vehicle is currently located. For example, the location recognition device 130 may detect information indicating a total number of lanes of a road on which the vehicle is driving and the location of the vehicle on the road, based on map data stored in the storage 150 and the location of the vehicle obtained through a GPS module.

The location recognition device 130 determines a road on which the vehicle is located by mapping the location of the vehicle obtained through the GPS module to the map data, determines the road on which the vehicle is driving by detecting a lane from the image captured through the camera 110, and finally determines a road on which the vehicle is currently located based on the determined information of the road.

The location recognition device 130 may determine the road on which the vehicle is located based on an angle formed by a median strip with respect to the longitudinal axis of the vehicle, when detecting the median strip through the camera 110. For example, the location recognition device 130 determines the vehicle to be located on a first lane when the angle between the median strip and the longitudinal axis of the vehicle, which is sensed by the camera 110, is within 10°.

The pedestrian recognition device 140 detects a pedestrian located around the vehicle through the in-vehicle sensors (e.g., an image sensor, a radar sensor, a LiDAR sensor, and/or an ultrasonic sensor). In other words, the pedestrian recognition device 140 may determine whether an object positioned at a front portion, a rear portion, and/or a side portion of the vehicle is a person.

The pedestrian recognition device 140 calculates an appearance angle (θp) of the sensed pedestrian. The pedestrian recognition device 140 calculates the appearance angle (θp) at specific time intervals.

The storage 150 may store a program for an operation of the processor 170 and may temporarily store input/output data. The storage 150 may store the map data and the image data obtained through the camera 110. The storage 150 may be implemented with at least one of a flash memory, a hard disc, a secure digital card (SD card), a RAM (random access memory), a ROM (read only memory), an erasable programing ROM, a web storage, and the like.

The display device 160 may outputs visible information under the control of the processor 170. The display device 160 may display, on a screen, an image captured through the camera 110. The display device 160 may include at least one of an LCD (liquid crystal display), a TFT LCD (thin film transistor-liquid crystal display), an OLED (organic light-emitting diode) display, a flexible display, a third dimension (3D) display, a transparent display, an HUD (head-up display), a touch screen, and a cluster.

The display device 160 may include a sound output module, such as a speaker, capable of outputting audio data. For example, the display device 160 may output an alarm sound through the speaker to alert the appearance of a pedestrian when the appearance of the pedestrian is sensed.

The processor 170 controls the overall operation of the image processing apparatus 100. The processor 170 may perform image processing, such as noise removal, color reproduction, image quality, chroma control, and file compression, with respect to the image captured through the camera 110.

The processor 170 may include at least one of application specific integrated circuits (ASICs), digital signal processors (DSPs), programmable logic devices (PLDs), field programmable gate arrays (FPGAs), central processing units (CPUs), microcontrollers, and microprocessors.

The processor 170 may calculate the image capturing direction (the angle of the camera) of the camera 110 based on information detected through at least one of the location recognition device 130 and the pedestrian recognition device 140.

The processor 170 calculates an angle (θcl) of the camera 110 through the location recognition device 130, based on the information (Nc) indicating a lane on which a vehicle is located and the information (Nt) indicating a total number of lanes of the road on which the vehicle is driving. In this case, the angle (θcl) of the camera 110 refers to the angle famed between the longitudinal direction of the vehicle and the camera axis. In this case, the processor 170 calculates the lane difference (ΔN (=(Nt+1)/2−Nc)) between the central lane (=(Nt+1)/2) positioned at the center of a road on which the vehicle is driving and the current lane (Nc) on which the vehicle is located.

For example, in the case that a road on which the subject vehicle is driving has five lanes (Nt) and the subject vehicle is located at the first lane (Nc), the processor 170 calculates ΔN(=(5+1)/2−1)=2.

The processor 170 calculates the angle of the camera 110 by using the calculated lane difference (ΔN). In this case, the processor 170 calculates a front camera angle according to Equation 1.

$$\theta cl = k \times \Delta N \qquad \text{Equation 1}$$

In this case, k, which is a constant, is determined depending on the information on a lane width of each road type (e.g., a highway, a national road, or the like).

The processor 170 calculates a rear camera angle (−θcl) based on the front camera angle.

The processor 170 transmits the information on the calculated image capturing direction of the camera 110 to the driving device 120. In other words, the processor 170 transmits the calculated camera angle to the driving device 120. The driving device 120 controls the camera 110 up, down, left, or right by controlling the operation of the motor, thereby adjusting the image capturing direction of the camera 110.

As illustrated in FIG. 2, the processor 170 rotates the camera axis of the front camera at θcl about the longitudinal axis (reference axis) of the vehicle and the camera axis of the rear camera at −θcl about the longitudinal axis (reference axis) of the vehicle, through the driving device 120.

The processor 170 detects a pedestrian among objects located around the vehicle through the pedestrian recognition device 140. In other words, the processor 170 determines whether a person exists at the front, rear, or side of the vehicle through the pedestrian recognition device 140.

The processor 170 calculates the appearance angle (θp) of the pedestrian at regular time intervals when the pedestrian is detected by the pedestrian recognition device 140. In other words, as illustrated in FIG. 3, the processor 170 calculates the angle (θp) formed between the longitudinal axis (reference axis) of the vehicle and the pedestrian detected by the pedestrian recognition device 140.

The processor 170 calculates a left/right angle (θcar) of the camera 110, i.e., the angle of the camera, at regular time intervals based on the appearance angle (θp) of the pedestrian. The processor 170 calculates the angle (θcar) of the camera according to Equation 2.

$$\theta car = P \times \theta p \qquad \text{Equation 2}$$

In this case, P, which is a constant, is predefined.

The processor 170 designates the limit angle of the camera 110 as θc in the rotation of the camera 110 as illustrated in FIG. 3. The processor 170 sets the angle (θcar) of the camera 110 to the limit angle (θc) when the calculated angle (θcar) of the camera 110 is equal to or less than the limit angle (θc).

In other words, as the limit angle of the camera 110 is set, the camera 110 is not moved at the limit angle θc or less when the camera 110 is rotated such that the minimum safety visibility is ensured.

The processor 170 adjusts the angle of the camera 110 by controlling the driving device 120 based on the calculated angle (θcar) of the camera 110. The driving device 120 adjusts the angle of the camera 110 by driving the motor. In this case, the driving device 120 rotates the front camera 110 and the rear camera 110 by synchronizing the angle of the front camera 110 with the angle of the rear camera 110.

The processor 170 determines the display form of an image, which is input through the camera 110, based on a user input, gear information, or a vehicle operation mode (e.g., a parking mode, a driving mode, or the like). In this case, the display form is any one of a front display, a rear display, a surround view display (or around view display), and a subject car display. For example, the processor 170 displays a front-directional image of the vehicle in the surround view form when the vehicle is parked. Meanwhile, the processor 170 determines the position of a gearshift lever of the vehicle through a gear position sensor and displays a rear image when the determined position of the gearshift lever is a rear position.

Figure 4:
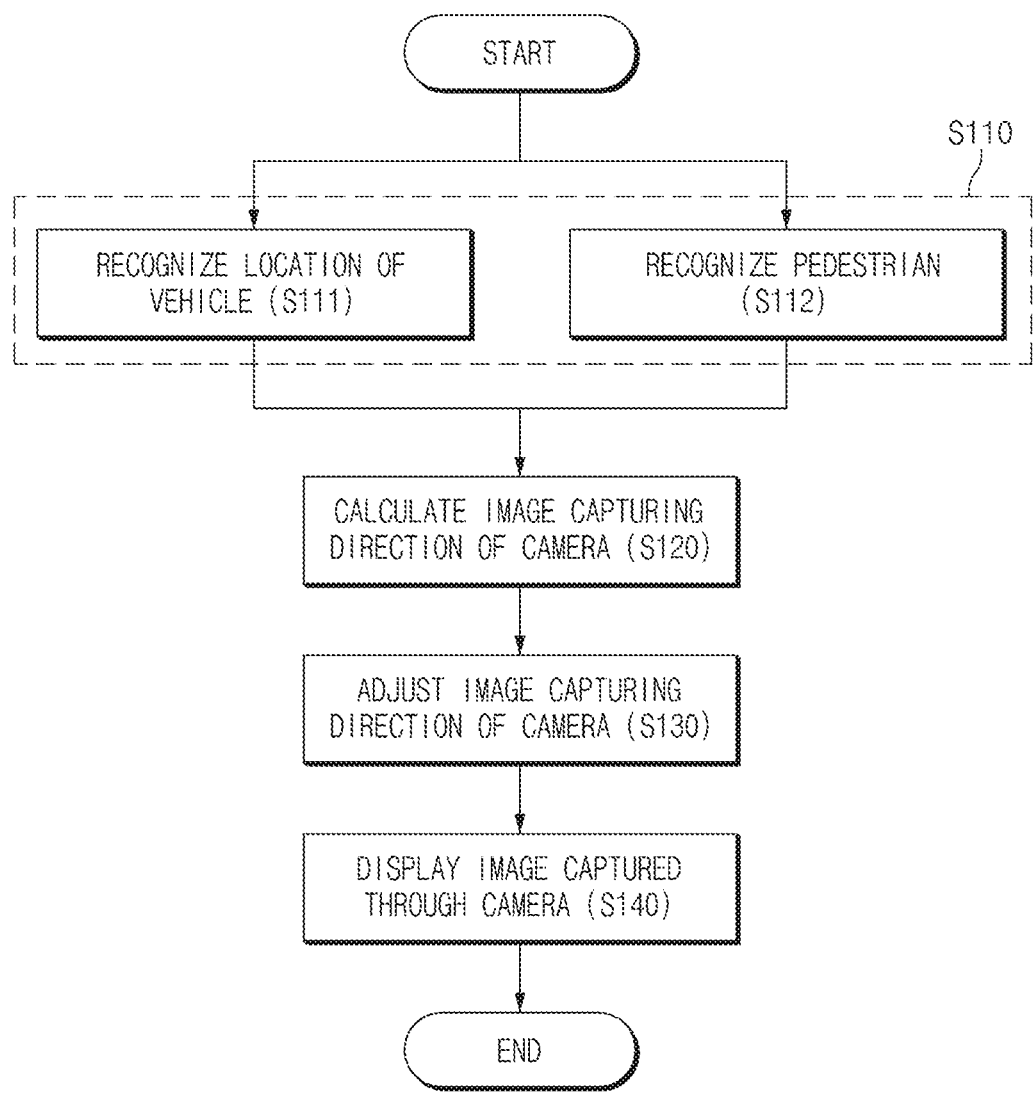
FIG. 4 is a flowchart illustrating an image processing method for a vehicle, according to embodiments of the present disclosure.

FIG. 4 is a flowchart illustrating an image processing method for a vehicle, according to embodiments of the present disclosure.

As shown in FIG. 4, the processor 170 detects a vehicle location and a pedestrian location obtained through the in-vehicle sensor (S110). The processor 170 calculates, through the location recognition device 130, the information indicating a total number of lanes of a road on which the vehicle is currently driving and information indicating a lane on which the vehicle is currently located (S111). The processor 170 calculates the appearance angle of a pedestrian existing around the vehicle through the pedestrian recognition device 140 (S112).

The processor 170 calculates an image capturing direction (i.e., camera angle) based on at least one of vehicle location information and pedestrian location information (S120). The processor 170 calculates the rotation angle of the camera 110 using the vehicle location information, such as the information indicating the total number of lanes on which the vehicle is driving and the information indicating a lane on which the vehicle is located. In addition, the processor 170 calculates the angle of the camera 110 by using the appearance angle of the pedestrian as the pedestrian location information.

The processor 170 adjusts the angle of the camera 110 in the calculated image capturing direction of the camera 110 (S130). The processor 170 rotates the camera 110 by controlling the driving device 120 based on the calculated angle of the camera 110. In this case, the driving device 120 rotates the camera 110 up, down, left or right by driving the motor under the control of the processor 170.

The processor 170 outputs, on the display device 160, the image captured through the adjusted camera 110 (S140). The processor 170 determines the display form (i.e., display mode) of the image captured through the camera 110 depending on the user input, the gear information, or the vehicle operation mode.

As described above, according to the present disclosure, the vehicle may detect the information of the lane on which the vehicle is driving and/or the information on the pedestrian around the vehicle and the angle of the camera may be dynamically adjusted, thereby serving an image of the lane necessary for the driver to the driver only by adjusting the angle of the camera without the image processing.

In addition, according to the present disclosure, since the image capturing direction of the camera is adjusted by rotating the camera, the image may be provided at the wider view angle, and the distortion of the image displayed on the display device may be reduced.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An image processing apparatus for a vehicle, comprising:
   a camera configured to capture an image around the vehicle;
   a driving device adjusting an image capturing direction of the camera;
   a location recognition device detecting a location of the vehicle, wherein the location of the vehicle includes information indicating a number of lanes of a road on which the vehicle is driving and information indicating a lane on which the vehicle is located;
   a pedestrian recognition device detecting a pedestrian around the vehicle; and
   a processor controlling the driving device so as to adjust the image capturing direction of the camera based on information detected by at least one of the location recognition device and the pedestrian recognition device,
   wherein the processor calculates a lane difference between a central lane positioned at a center of the road and the lane on which the vehicle is located, and calculates an angle of the camera based on the lane difference and a constant, and transmits the angle of the camera to the driving device, and
   wherein the constant is determined depending on a lane width of the road.

2. The image processing apparatus of claim 1, wherein the driving device rotates the camera up, down, left, or right using a motor.

3. The image processing apparatus of claim 1, wherein the pedestrian recognition device calculates an appearance angle of the pedestrian when the pedestrian is detected around the vehicle.

4. The image processing apparatus of claim 3, wherein the processor calculates the image capturing direction of the camera based on the appearance angle of the pedestrian.

5. The image processing apparatus of claim 1, wherein the image capturing direction of the camera is an angle formed between a longitudinal axis of the vehicle and a camera axis.

6. The image processing apparatus of claim 1, further comprising:
   a display device displaying the image captured by the camera.

7. The image processing apparatus of claim 1, wherein the camera senses a median strip, and the location recognition device detects a lane on which the vehicle is located based on an angle formed between a longitudinal axis of the vehicle and the median strip.

8. An image processing method for a vehicle, comprising:
  detecting a location of the vehicle using a location recognition device, wherein the location of the vehicle includes information indicating a number of lanes of a road on which the vehicle is driving and information indicating a lane on which the vehicle is located;
  detecting a pedestrian around the vehicle using a pedestrian recognition device;
  calculating an image capturing direction of a camera based on at least one of the location of the vehicle and a location of the pedestrian; and
  controlling a driving device so as to adjust the camera in accordance with the image capturing direction of the camera,
  wherein the calculating the image capturing direction of the camera includes:
  calculating a lane difference between a central lane positioned at a center of the road and the lane on which the vehicle is located;
  calculating an angle of the camera based on the lane difference and a constant; and
  transmitting the angle of the camera to the driving device,
  wherein the constant is determined depending on a lane width of the road.

9. The image processing method of claim 8, wherein the detecting of the location of the vehicle and the detecting of the pedestrian includes:
  calculating an appearance angle of the pedestrian when the pedestrian is detected around the vehicle.

10. The image processing method of claim 9, wherein the calculating of the image capturing direction of the camera includes:
  calculating the image capturing direction of the camera based on the appearance angle of the pedestrian.

11. The image processing method of claim 8, wherein the image capturing direction of the camera is an angle formed between a longitudinal axis of the vehicle and a camera axis.

12. The image processing method of claim 8, wherein the controlling of the driving device to adjust the camera includes:
  adjusting an angle of the camera by driving a motor in the image capturing direction of the camera.

13. The image processing method of claim 12, further comprising:
  displaying, on a display screen, an image captured by the camera having the adjusted angle, after the controlling of the driving device to adjust the camera.

* * * * *